United States Patent [19]

Takatsu

[11] Patent Number: 4,686,572

[45] Date of Patent: Aug. 11, 1987

[54] DRIVING DEVICE FOR INTERLINE-TRANSFER CCD FOR USE IN ELECTRONIC STILL CAMERA

[75] Inventor: Norihiko Takatsu, Tokyo, Japan

[73] Assignee: Nippon Kogaku K. K., Tokyo, Japan

[21] Appl. No.: 797,490

[22] Filed: Nov. 13, 1985

[30] Foreign Application Priority Data

Nov. 19, 1984 [JP] Japan .................................. 59-243992

[51] Int. Cl.⁴ .............................................. H04N 3/14
[52] U.S. Cl. .................................. 358/213.13; 358/105
[58] Field of Search ................. 358/909, 213, 212, 105

[56] References Cited

U.S. PATENT DOCUMENTS 4,064,533 12/1977 Lampe et al. ......................... 358/213
4,535,363 8/1985 Harada et al. ....................... 358/213
4,541,016 9/1985 Ochi et al. ............................ 358/213

Primary Examiner—Gene Z. Rubinson
Assistant Examiner—Stephen Brinich
Attorney, Agent, or Firm—Shapiro and Shapiro

[57] ABSTRACT

An electronic still camera is provided with an interline-transfer CCD having a light-receiving section and a vertical transfer section, and a shutter for intercepting the incoming light. The light-receiving section of the interline-transfer CCD transfers the signal charges at least twice to the vertical transfer section during an open-close operation of the shutter for exposure.

4 Claims, 11 Drawing Figures

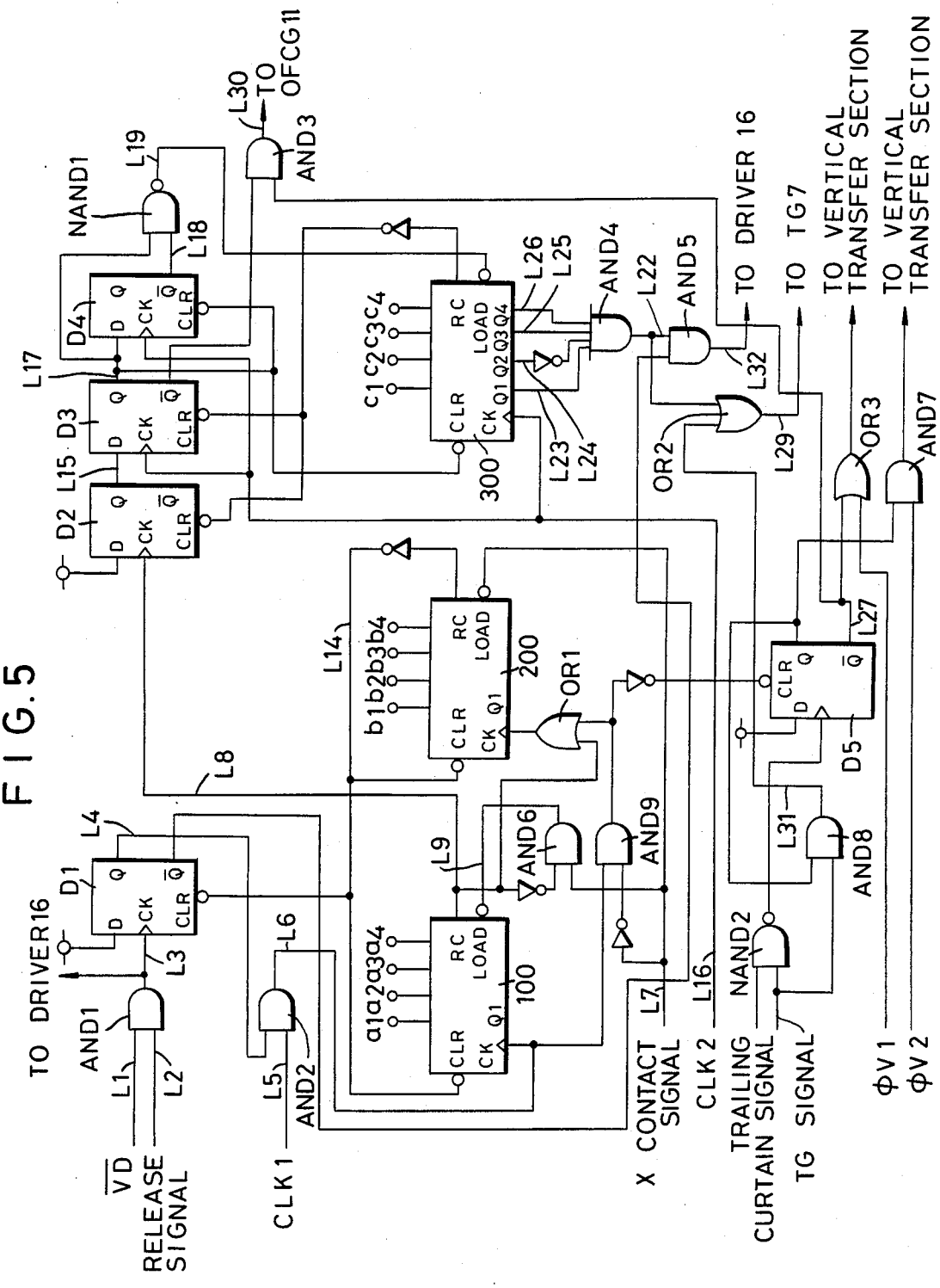
F I G. 5

DRIVING DEVICE FOR INTERLINE-TRANSFER CCD FOR USE IN ELECTRONIC STILL CAMERA

BACKGROUND OF THE INVENTION

1. Field of the Invention

The present invention relates to an electronic still camera utilizing, as the image sensor, an interline transfer CCD, which will hereinafter abbreviated as IT-CCD.

2. Description of the Prior Art

A fast moving object, recorded with a conventional camera utilizing a silver halide film or an electronic still camera utilizing a solid-state image sensor appears as a blurred image as shown in FIG. 1A. On the other hand, a picture resolved in time, as shown in FIG. 1B, can only be obtained by using a flash device providing plural flashes in an exposure, in combination with the camera.

However such flash device used for obtaining pictures resolved in time has been associated with various drawbacks such as requiring a high voltage, being bulky and inconvenient for transportation. Also such picture can only be obtained within the illuminating range of such flash device.

SUMMARY OF THE INVENTION

The object of the present invention, therefore, is to provide an electronic still camera capable of providing a picture resolved in time, through the function of the camera itself, without any additional device such as a flash unit.

The foregoing object can be achieved according to the present invention by effecting transfer of signal charges from the light-receiving section of an interline-transfer CCD to the vertical transfer section thereof at least twice during an exposure of the shutter and accumulating, in said vertical transfer section, the signal charges transferred at least twice during an exposure of the shutter.

BRIEF DESCRIPTION OF THE DRAWINGS

FIG. 5 is a circuit diagram showing the details of a part of the control circuit shown in FIG. 2.

DESCRIPTION OF THE PREFERRED EMBODIMENTS

Figure 2:
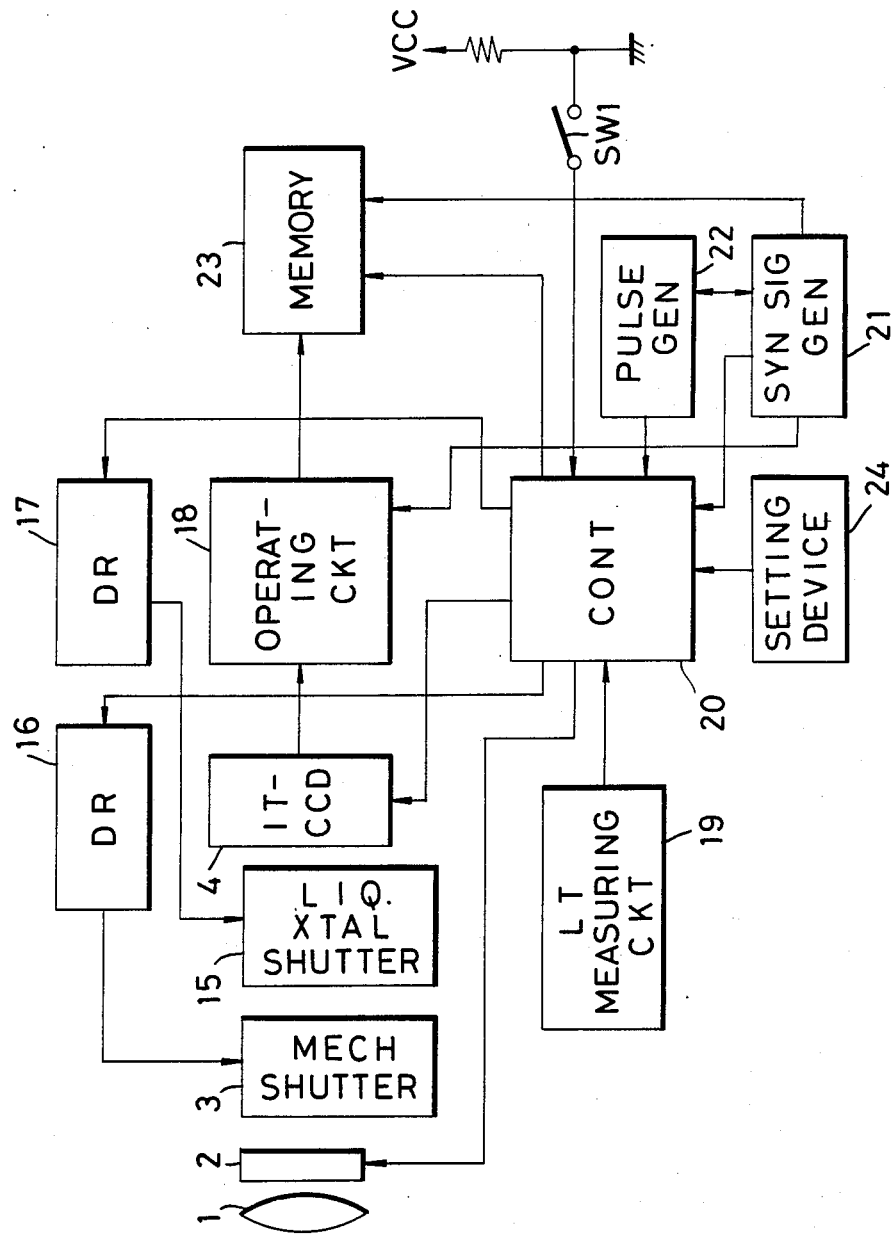
FIG. 2 is a block diagram of an electronic still camera according to the present invention.

In FIG. 2, there are shown a lens 1; a diaphragm 2; a focal plane shutter 3 of which exposure time is mechanically determined by the movements of a leading curtain and a trailing curtain; and an interline transfer charge-coupled device (IT-CCD) 4 constituting a solid-state image sensor. In the present embodiment there is employed an IT-CCD with an overflow drain.

A driving device 16 drives the mechanical shutter 3, while another driving device 17 drives a liquid crystal shutter 15. A light measuring circuit 19 measures the luminance of an object, and supplies an output signal to a control circuit 20. A setting device 24 selects the number of transfers of signal charges from the light-receiving section of the IT-CCD to the vertical transfer section during an open period of the shutter 3. An operating circuit 18 converts the signal from the IT-CCD 4 into video signals and stores the same in a memory 23. A pulse generator 22 generates pulses used as reference for driving pulses $\phi_{v1}$ and $\phi_{v2}$ for the vertical transfer section of the IT-CCD 4. In response to the pulses from pulse generator 22, the control circuit 20 forms the pulses $\phi_{v1}$, $\phi_{v2}$ and supplies the same to the IT-CCD 4. A synchronous signal generator 21 supplies vertical synchronization signals to the control circuit 20, operation circuit 18 and memory 23. A switch SW1 is closed when a release button, for starting the exposure of the electronic still camera, is actuated. The pulse generator 22 and the synchronous signal generator 21 function in such a manner that the output signals thereof have mutually coinciding phases.

Figure 3:
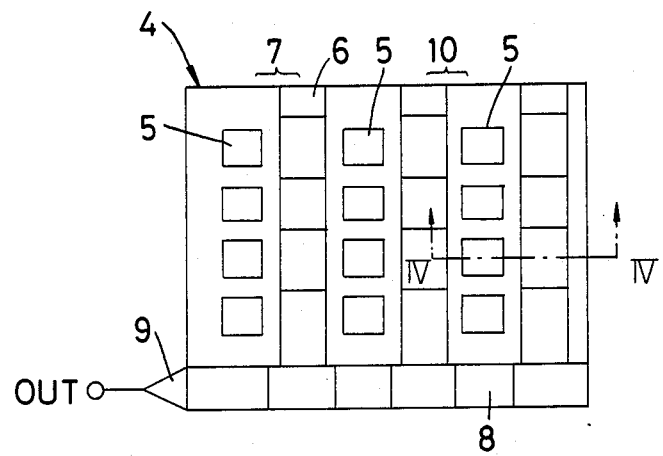
FIG. 3 is a schematic view showing the structure of an interline transfer CCD to be employed in the present invention.

The IT-CCD 4 has a structure as shown in FIG. 3 and comprises light-receiving sections 5 for converting the received light into signal charges and accumulating said signal charges; transfer gates 7 (TG) for controlling the transfer of signal charges from the light-receiving sections 5 to vertical transfer sections 6; and a horizontal transfer section 8 for transferring the signal charges from said vertical transfer sections 6 to a floating diffusion amplifier 9 which converts said signal charges to signal voltages of a defined range.

Adjacent to the light-receiving sections there are provided overflow drains 10 (OFD) for discharging excessive charges generated in the light-receiving sections 5 via, overflow control gates (OFCG) to be explained later etc.

Figure 4A:
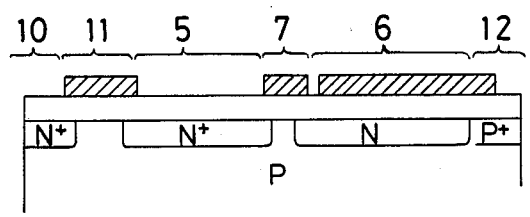
FIG. 4A is a cross-sectional view along a line IV—IV in FIG. 3.
Figure 4B:
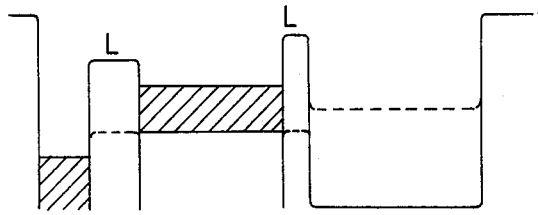
FIGS. 4B to 4D are schematic views showing the potential states and transfer of signal charges under gate control.
Figure 4C:
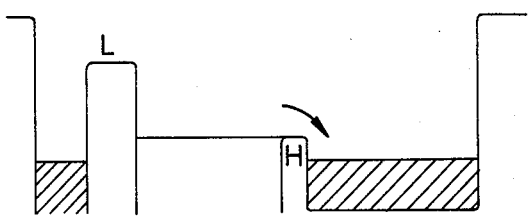
Figure 4D:
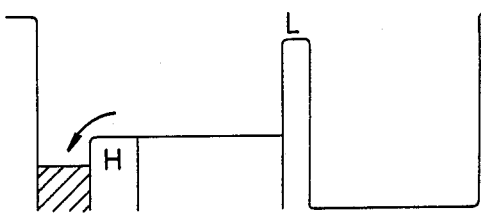

Prior to the explanation of the driving device for an IT-CCD according to the present invention, there will be given an explanation of the function of the light-receiving section 5, transfer gate 7, vertical transfer section 6, overflow drain 10 and overflow control gate in relation to the transfer of signal charges, while making reference to FIG. 4A giving a cross-sectional view along a line IV—IV in FIG. 3 and to FIGS. 4B–4D showing the various potential states.

As shown in FIG. 4A, which is a cross-sectional view alone a line IV—IV in FIG. 3, there are formed, from left to right, an overflow drain 10, an overflow control gate 11, a light-receiving section 5, a transfer gate 7, a vertical transfer section 6 and a channel stopper 12 as an integrated structure on a p-type substrate.

FIG. 4B shows a state of accumulating a signal charge in the light-receiving section 5. In this state the overflow control gate 11 and the transfer gate 7 are both in a low (L)-level state, whereby a signal charge, represented by a hatched area, is accumulated in the light-receiving section 5. An excessive charge, if generated, will not flow to the vertical transfer section 6 because of the transfer gate 7 in said L-level state, but is drained to the overflow drain 10, flowing over the overflow control gate 11 which is likewise in the L-level state.

Then, FIG. 4C shows a state in which the transfer gate 7 is shifted, from the L-level state shown in FIG.

4B, to a high (H) level state. Because of said shift, the signal charge accumulated in the light-receiving section 5 is entirely transferred to the vertical transfer section 6. Subsequently the transfer gate 7 is again shifted to the L-level state, and the vertical transfer section 6 and the horizontal transfer section 8 shown in FIG. 3 are activated. In this manner voltage signals corresponding to the signal charges pass through the floating diffusion amplifier 9.

FIG. 4D shows a state in which the overflow control gate 11 is shifted, from the state shown in FIG. 4B, to the H-level state, whereby the signal charge accumulated in the light-receiving section 5 is entirely drained to the overflow drain 10. In this manner no charge is left in the light-receiving section 5.

In FIG. 5, there are shown a vertical synchronization signal VD; an inverted vertical synchronization signal $\overline{VD}$; a RELEASE SIGNAL which assumes the H-level in response to the closing of the switch SW1; a clock signal CLK1; a synchronization signal CLK2 of a shorter period than that of said clock signal CLK1; an X-contact signal assuming the H-level in response to the full opening of the shutter 3; a trailing curtain signal assuming the H-level in response to the movement of the trailing curtain of the shutter 3; a TG signal which assumes the H-level for a determined period when the vertical synchronization signal is at the L-level, independently from the exposure operation, to apply a voltage to the transfer gate 7; and pulses $\phi_{v1}$, $\phi_{v2}$ for driving the vertical transfer section 6 after the TG signal assumes the H-level, independently from the exposure operation.

In FIG. 5, a counter 100 measures, during an opening operation of the shutter 3, a period corresponding to the interval of plural transfers of signal charges from the light-receiving section 5 to the vertical transfer section 6, and generates a pulse from a ripple carry port RC upon measuring such period of interval. Ports a1, a2, a3 and a4 are provided for entering a signal representing said period of interval. A counter 200 counts, during an opening operation of the shutter 3, the number of transfers of signal charges from the light-receiving section 5 to the vertical transfer section 6, and generates a pulse from a ripple carry port RC when the count reaches a number set by the setting device 24. Ports b1, b2, b3 and b4 are provided for entering a signal representing the number of times set by said setting device 24. A counter 300 measures, during an opening operation of the shutter 3, each accumulating time in plural charge accumulations of the light-receiving section 5, and generates a pulse from a ripple carry port RC, upon measuring an accumulating time represented by a signal entered from input ports c1, c2, c3 and c4. There are also provided D-flip-flops D1–D5; AND gates AND1–AND9; OR gates OR1–OR3; and NAND gates NAND1, NAND2. The control circuit 20 is provided with an operation unit for determining the accumulating time and the period of interval in the light-receiving section 5 according to the number set by the setting device 24 and the output of the light measuring circuit 19, and said operation unit supplies a signal representing said accumulating time of the light-receiving section 5 to the ports c1-c4, and a signal representing the period of interval to the ports a1 - a4. There are also illustrated signal lines L1, L2, L3, L4, L5, L7, L8, L9, L14, L15, L16, L17, L18, L19, L22, L23, L24, L25, L26, L27, L29 and L30.

Now there will be given an explanation of the function of an IT-CCD according to the present invention for obtaining a picture resolved in time, based on the function of the IT-CCD shown in FIGS. 4B–4D and the function of the circuit shown in FIG. 5, and making further reference to timing charts of an electronic still camera shown in FIGS. 6 and 7.

When the power supply to the electronic still camera is turned on, the IT-CCD 4 performs an ordinary video operation in response to the vertical synchronization signal VD and horizontal synchronization signal $\phi$H. No signal charge is present either in the light-receiving section 5 or in the vertical transfer section 6 in this state, because the shutter is closed.

Then, when the release signal is shifted to the H-level and the VD signal is shifted to the L-level, an H-level signal is entered to the port CK of the flip-flop D1 through the line L3 to shift the output Q thereof on the line L4 to the H-level. Thus the clock signal CLK1 is supplied to the port CK of the counter 100. Also in response to the shift of the line L3 from the H-level to the L-level, the driver 16 initiates the movement of the leading curtain of the shutter, at a time $t_1$. The counter 100, 200 or 300 reads the signal from the ports a1–a4, b1–b4 or c1–c4 when an L-level signal is received at the load port and the clock signal is entered to the CK port, and initiates the measuring operation when the input to the load port is shifted to the H-level. Thus, the counter 100, receiving an L-level input to the load port in this state, reads a signal from the ports a1–a4. Subsequently, when the shutter 3 becomes fully open, the X-contact signal is shifted to the H-level to supply an H-level signal to the load port of the counter 100, thus initiating the measuring operation thereof. Upon measuring a period corresponding to the time read from the ports a1–a4, the counter produces a pulse from the ripple carry port RC, whereby the output Q of the flip-flop D2 is shifted to the H-level, and the output Q of the flip-flop D3 is thereafter shifted to the H-level in response to the start of the clock pulse CLK2. Then, in response to the shift of the output $\overline{Q}$ of the flip-flop D3 to the L-level, the output of the AND gate AND3 is shifted to the L-level to supply an L-level signal to the overflow control gate 11, thereby prohibiting the flow of charge from the light-receiving section 5 to the overflow drain 10 and initiating the charge accumulation in said light-receiving section 5, at a time $t_3$.

After the shift of the output Q of the flip-flop D3 to the H-level, the output $\overline{Q}$ of the flip-flop D4 is shifted to the L-level in response to the start of the clock signal CLK2. The counter 300 reads a signal from the ports c1–c4 in response to the shift of the output Q of the flip-flop D2 to the H-level, and initiates the measuring operation in response to the shift of the output $\overline{Q}$ of the flip-flop D3 to the L-level. Said counter 300 divides the frequency of the clock signal CLK2 and produces a signal obtained by frequency division from ports Q1, Q2, Q3 and Q4. The levels of said ports Q1, Q2, Q3 and Q4 at the start of frequency division correspond to those of the ports c1–c4 read by the counter 300. When the output signals at the ports Q1–Q4 of the counter 300 assume a determined state, the gate AND4 outputs an H-level signal, at a time $t_4$. Said signal returns to the L-level after a determined period, at a time $t_5$. After the lapse of a determined period from the returning of said signal to the L-level, the counter 300 produces an H-level signal from the ripple carry port RC. In response thereto, the output Q of the flip-flop D3 is shifted to the L-level, thus clearing the flip-flop D4 and the counter 300, at a time $t_6$. The above-explained procedure in a period from $t_3$ to $t_6$ is repeated in periods from $t_7$ to $t_{10}$ and from $t_{11}$ to $t_{14}$. Then, in response to the shift of the output of the gate AND5 from the H-level to the L-level, the driver 16 initiates the movement of the trailing curtain of the shutter.

The function of the IT-CCD 4 is effected in relation to the above-explained procedure.

At the time $t_3$ when the leading curtain of the shutter 3 is fully opened, the overflow control gate 11 is shifted to the L-level state. Thus the light-receiving section 5 enters the signal charge accumulating state as shown in FIG. 4B, wherein signal charges obtained by photoelectric conversion of light entering through the shutter in open state are accumulated. At the time $t_4$, the transfer gate 7 is shifted to the H-level state while the overflow control gate 11 remains in the L-level state, whereby the signal charges accumulated in the light-receiving section 5 in a period from $t_3$ to $t_4$ are transferred as shown in FIG. 4C to the vertical transfer section 6, which therefore stores the image in a period from $t_3$ to $t_5$, including the charge when the transfer gate is activated.

At the time $t_5$, the transfer gate 7 is again shifted to the L-level state, thereby restoring the state of FIG. 4B in which the light-receiving section 5 is separated from the vertical transfer section 6. Then, at the time $t_6$, the overflow control gate 11 again assumes the H-level state, whereby the charge generated in the light-receiving section 5 is forcedly discharged to the overflow drain 10 as shown in FIG. 4D. Said forced drainage of charge continues to the time $t_7$, after which the procedure is the same as in the period of $t_3$ to $t_6$ is repeated, and a new instantaneous image is transferred to the vertical transfer section 6 in a period of $t_7$ to $t_{10}$. Consequently said vertical transfer section 6 stores added charges obtained by two or more transfers of signal charges.

The trailing curtain of the shutter starts to run at $t_{13}$, after repeating the above-mentioned procedure at least twice.

Figure 1A:
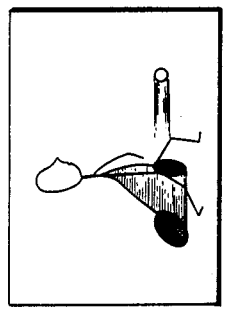
FIGS. 1A and 1B are schematic views showing the principle of the present invention.
Figure 1B:
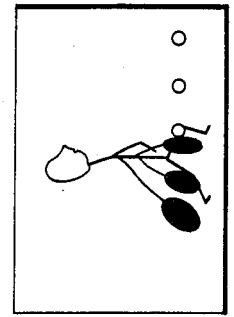
Figure 6:
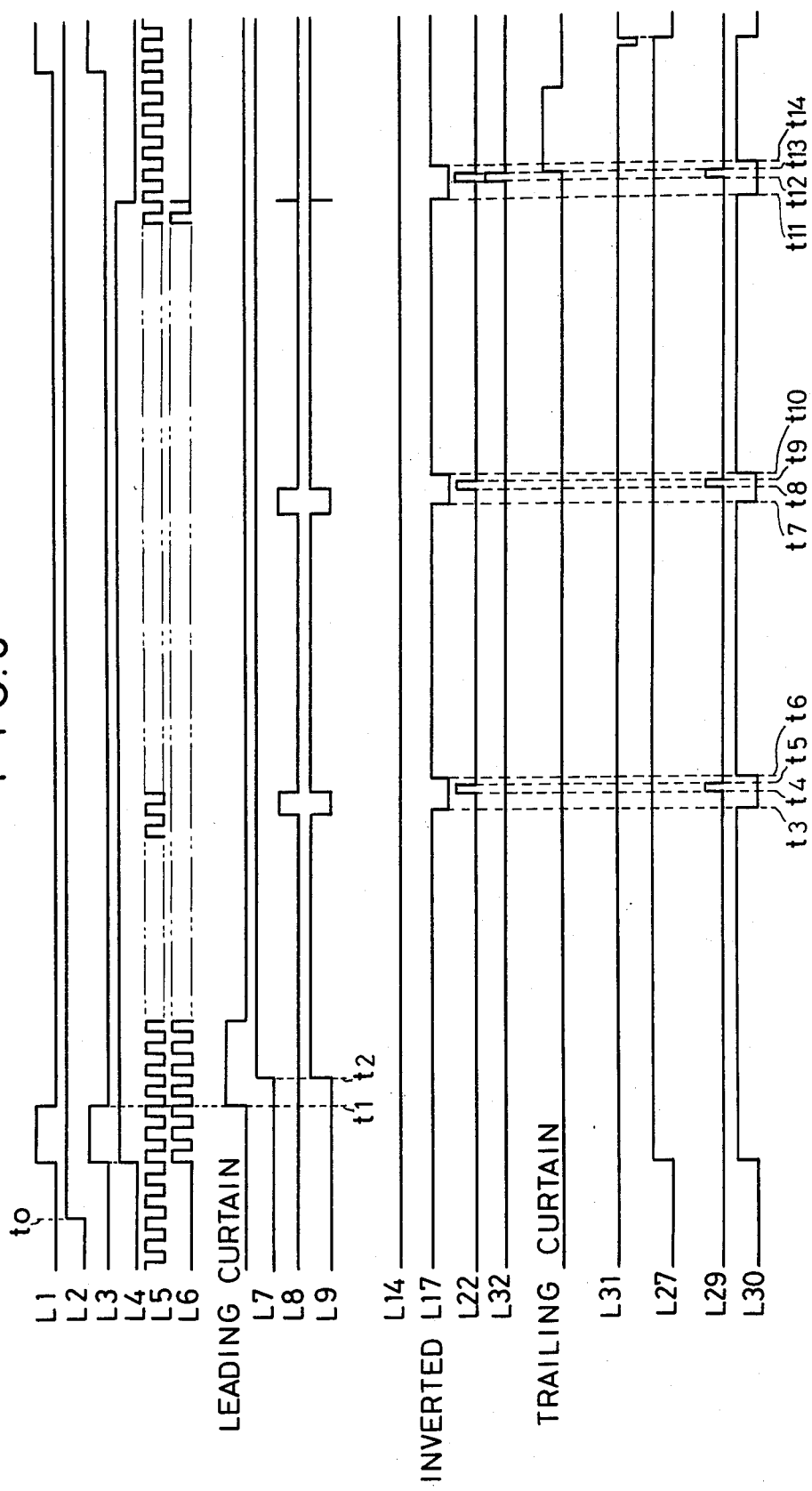
FIGS. 6 and 7 are timing charts showing the function of an embodiment of the present invention.
Figure 7:
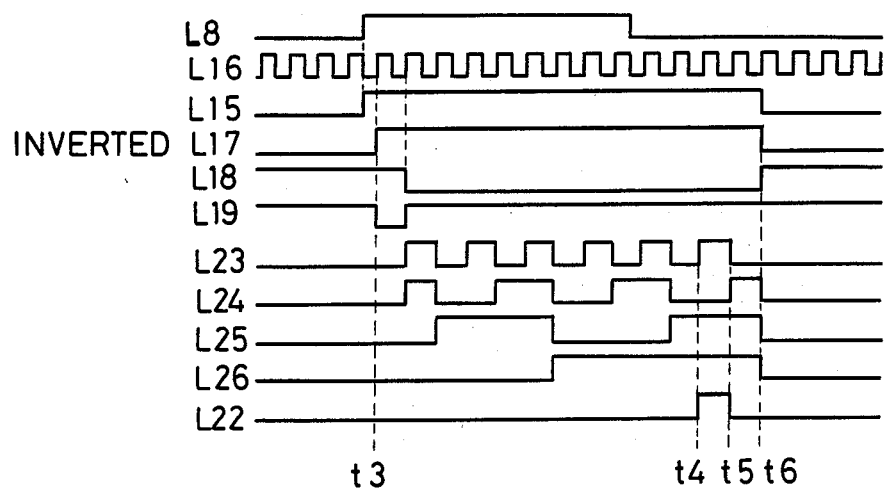

The period of exposure obtained in such procedure is intermittent in time as shown in FIG. 6, so that there is obtained an image, which, as shown in FIG. 1B, is resolved in time. Since the vertical transfer section 6 is not driven in a period of $t_1$ to $t_{13}$ in which the shutter is opened, there appears no vertically flowing smear in the image as in the conventional video camera utilizing an IT-CCD. However, a charge generated in a deep part of the substrate of the light-receiving section may enter the vertical transfer section while it is not driven. In order to avoid such phenomenon, a liquid crystal shutter 15 is placed between the mechanical shutter and the solid-state IT-CCD and is activated in the exposure periods $t_3-t_5$, $t_7-t_9$ and $t_{11}-t_{13}$. It is to be noted, however, that the object of the present invention can be achieved without such liquid crystal shutter, though the circuit shown in FIG. 2 includes such liquid crystal shutter.

In the IT-CCD driving method of the present invention, the charges accumulated in the vertical transfer section may exceed the ability of charge $ transfer thereof, since the signal charges generated in the light-receiving section are added at least twice in the vertical transfer section. In such case, the signal charges in the light-receiving section are drained into the overflow drain after the trailing curtain of the shutter is closed, and the light-receiving section is placed in the charge accumulating state and the signal charges, accumulated in the vertical transfer section and exceeding the transfer ability thereof, are returned to the light-receiving section. In such charge returning operation, the excessive signal charges are drained to the overflow drain 10 through the overflow control gate 11 as shown in FIG. 4C, and the signal charges are then again transferred to the vertical transfer section for signal readout. In this manner the signal transfer can be achieved without problem even if the signal charges accumulated in the vertical transfer section exceed the transfer ability thereof.

The number of resolution or division in time can be arbitrarily modified by the timing of the driving pulses for the overflow control gate and the transfer gate in the IT-CCD, and the interval in time is exact. For this reason the device of the present invention can also be used as a measuring apparatus for precisely measuring the movement of an object from the movement of an image divided in time.

According to the present invention, it is also to be noted that the entire image frame, or all the pixels, of the IT-CCD are simultaneously exposed at each of plural charge transfer. Making use of this feature, the device of the present invention can also be utilized as a camera for observing meteors, with a continuously open shutter, by cooling the IT-CCD to prolong the charge retaining period of the vertical transfer section.

What is claimed is:

1. An electronic still picture camera comprising:
   (a) a plurality of elements each of which generates charges corresponding to the intensity of incident light thereon and stores charges therein;
   (b) horizontal transfer means;
   (c) vertical transfer means;
   (d) transfer gate means;
   (e) first driving means for driving said transfer gate means so that said transfer gate means transfers charges generated by said plurality of elements to said vertical transfer means;
   (f) second driving means for driving said vertical transfer means so that said vertical transfer means transfers charges to said horizontal transfer means;
   (g) first inhibiting means for inhibiting said second driving means from driving said vertical transfer means for a first predetermined period of time;
   (h) control means for controlling said first driving means so that said transfer gate means transfers charges a plurality of times from said plurality of elements to said vertical transfer means in said first predetermined period of time, said vertical transfer means storing charges for said first predetermined period of time; and
   (i) second inhibiting means responsive to said control means for inhibiting said plurality of elements from storing charges for a second predetermined period of time following each of said transfer of charges by said transfer gate means.

2. An electronic still picture camera according to claim 1, which further comprises shutter means for controlling the exposure of said plurality of elements so that said plurality of elements are exposed for said first predetermined period of time, and wherein said first inhibiting means inhibits said second driving means from driving said vertical transfer means in response to said shutter means.

3. An electric still picture camera according to claim 1, wherein said second inhibiting means comprises means for counting said second predetermined period of time in response to the transfer of charges by said transfer gate means.

4. An electronic still picture camera according to claim 1, wherein said control means comprises means for controlling the number of said plurality of times of the transfer of charges by said transfer gate means.

* * * * *